Figure 5:
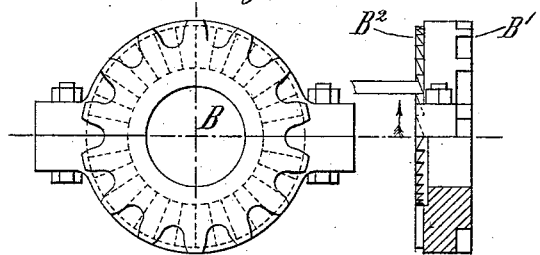

(No Model.) 4 Sheets—Sheet 1.
G. GUISSANI.
BRAKE.
No. 425,670. Patented Apr. 15, 1890.
Fig. 1.
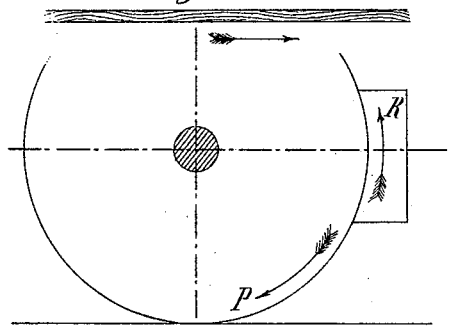
Fig. 2.
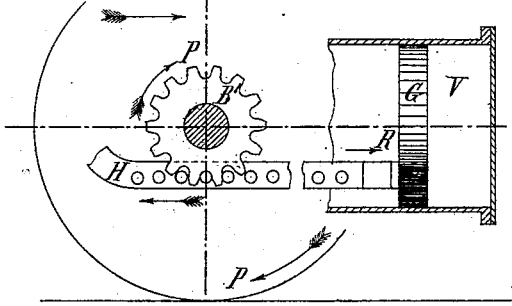
Fig. 3.
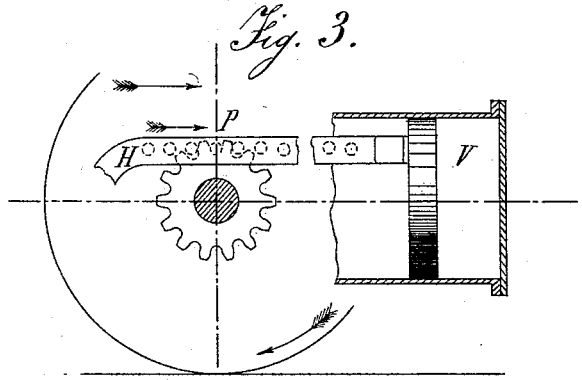
Fig. 3 bis.
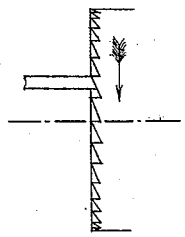
Fig. 4.
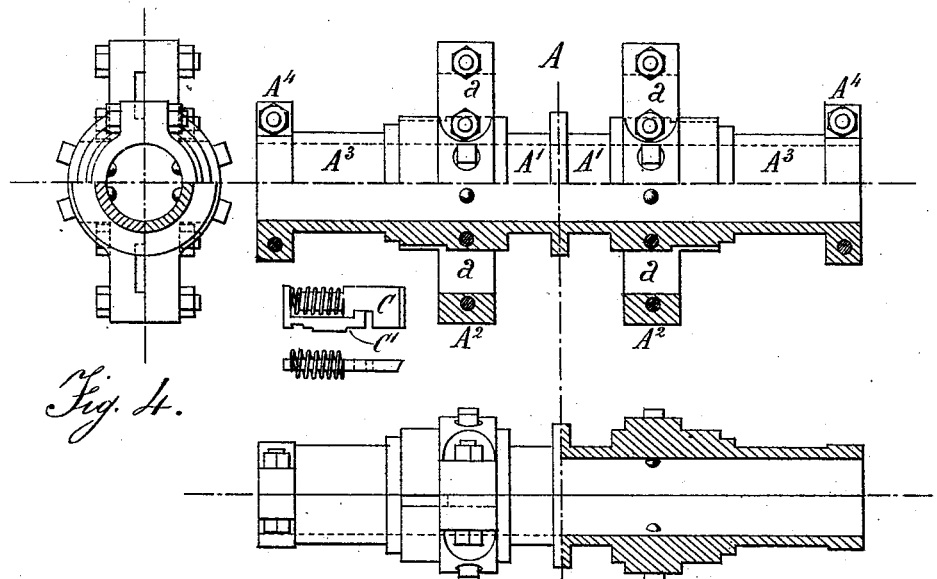
Witnesses:
Alex J Stewart
Thomas Durant
Inventor
Gaetano Guissani
by Church & Church
his attys.

(No Model.) 4 Sheets—Sheet 2.

G. GUISSANI.
BRAKE.

No. 425,670. Patented Apr. 15, 1890.

Witnesses:
Alex J. Stewart
Thomas Durant

Inventor:
Gaetano Guissani
by Church & Church
his attys.

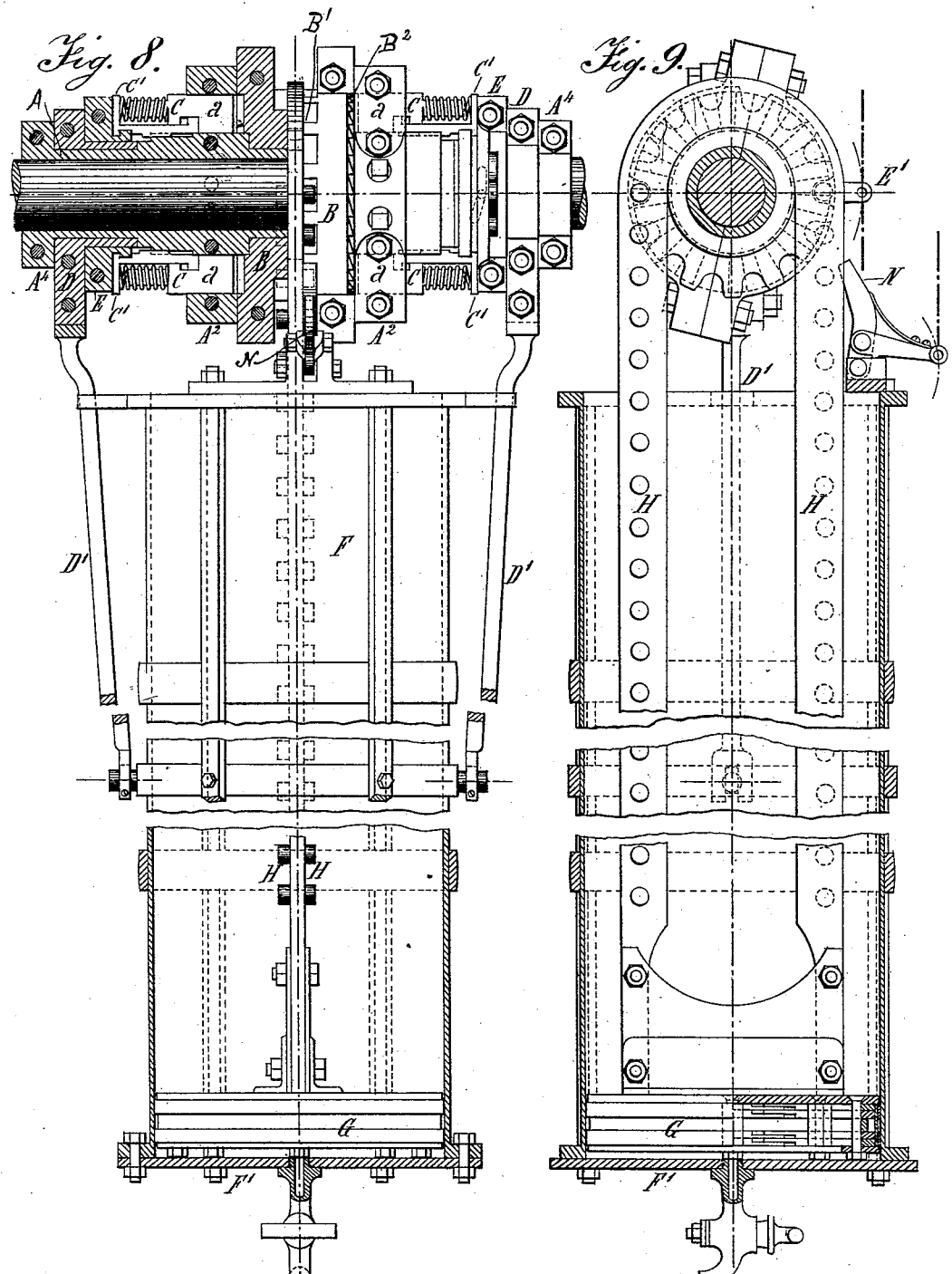

(No Model.) 4 Sheets—Sheet 4.
G. GUISSANI.
BRAKE.

No. 425,670. Patented Apr. 15, 1890.

Witnesses:
Alex J. Stewart.
Thomas Durant.

Inventor:
Gaetano Guissani
by Church & Church
his attys.

UNITED STATES PATENT OFFICE.

GAETANO GIUSSANI, OF TURIN, ASSIGNOR TO CARLO SACCO, OF GENOA, ITALY.

BRAKE.

SPECIFICATION forming part of Letters Patent No. 425,670, dated April 15, 1890.

Application filed April 29, 1889. Serial No. 309,077. (No model.) Patented in Italy March 12, 1889, No. 9,871; in France March 27, 1889, No. 197,019; in Belgium March 29, 1889, No. 85,589; in Austria-Hungary March 29, 1889, No. 14,524 and No. 37,035; in Germany April 6, 1889, No. 50,391; in England April 15, 1889, No. 6,453; in Switzerland May 10, 1889, No. 1,063, and in Spain May 25, 1889, No. 9,461.

*To all whom it may concern:*

Be it known that I, GAETANO GIUSSANI, a subject of the King of Italy, residing at Turin, Italy, have invented certain new and useful Improvements in or relating to Brakes applicable to Tramway and other Vehicles, (for which I have made application for Letters Patent in Great Britain, No. 6,453, dated April 15, 1889; in Italy, No. 9,871, dated March 12, 1889; in France, No. 197,019, dated March 27, 1889; in Belgium, No. 85,589, dated March 29, 1889; in Spain, No. 9,461, dated May 25, 1889; in Germany, No. 50,391, dated April 6, 1889; in Switzerland, No. 1,063, dated May 10, 1889, and in Austria-Hungary, Nos. 14,524 and 37,035, dated March 29, 1889,) of which the following is a specification.

In brakes such as are generally used for stopping traveling vehicles there are employed brake-blocks, which are forced against the tires of the wheels and arrest the movement of the vehicle by means of friction.

The object of the present invention is to use the momentum of the vehicle when it is desired to stop it in such a manner as to change the said momentum into mechanical force, which is afterward employed for automatically restarting the vehicle; and the invention consists, essentially, in certain novel apparatus for applying such mechanical force to the drawing out of a piston fitting air-tight in a hollow cylinder, thus creating a vacuum in the cylinder, the power necessary for such work effecting the stoppage of the vehicle. At the moment of starting the vehicle the piston is liberated and the atmospheric pressure drives the piston back into the cylinder, the force thus derived being used to start the vehicle automatically.

In the accompanying drawings the invention is represented as applied to a tramway-car drawn by horses; but it is evident that the invention can also be applied to other vehicles or other moving objects which are often arrested and started again.

Figure 12:
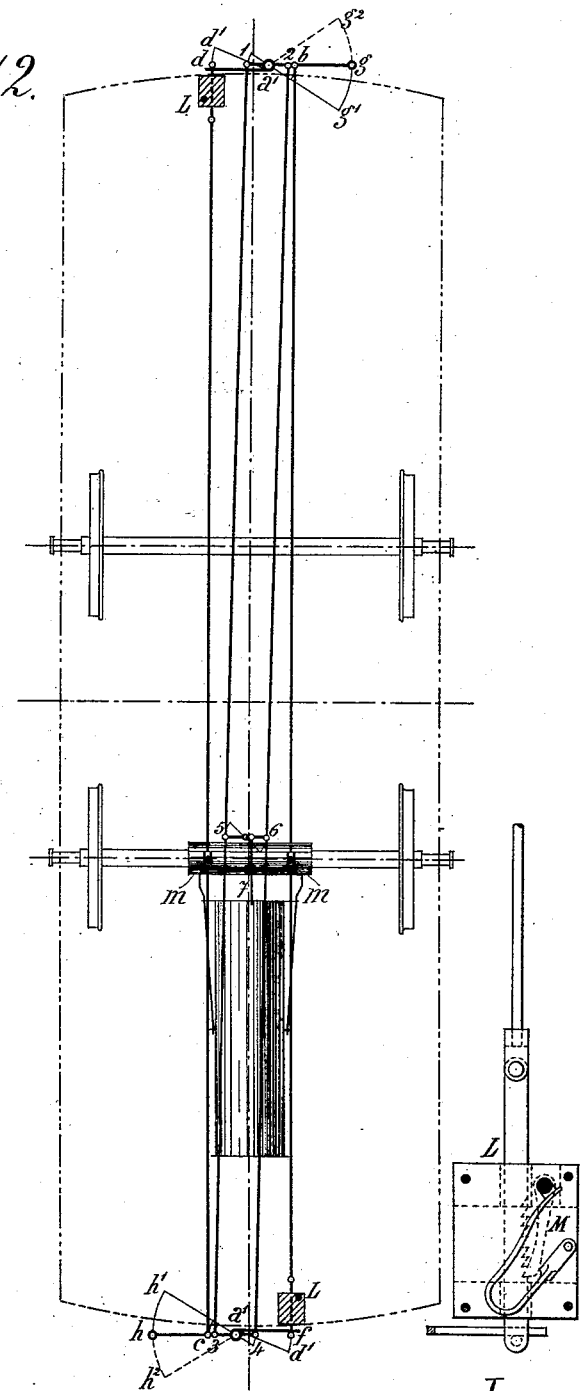

In the accompanying drawings, Figure 1 represents in diagram the application of the brake-block generally used up to the present. Fig. 2 represents a similar view of the cylinder and piston used as a brake. Fig. 3 represents the same cylinder at the moment of using the atmospheric pressure for starting the vehicle. Fig. 4 represents a sleeve consisting of two pieces strongly bolted together and fixed securely to one of the traveling-wheel axles of the vehicles, and on which sleeve are loosely mounted the wheels represented in Fig. 5. Figs. 3$^{bis}$, 5, 6, and 7 represent details of construction. Figs. 8, 9, 10, and 11 are details of the pressure-cylinder, showing the connection between the piston and axle. Fig. 12 represents diagrammatically the bottom of the car with the preferred arrangement of levers and connecting-rods.

By means of the sleeve represented in Fig. 5 the momentum of the vehicle is transmitted to the rod of the piston H, Fig. 8, at the moment it is desired to stop the vehicle, and afterward the sleeve is used for turning the axle by utilizing the force exerted on the piston when this latter is liberated. To this end two wheels B, Fig. 5, turn loosely at A' on the sleeve, and these wheels consist each of two pieces strongly bolted together. In the inner face B' of each of these wheels are formed square teeth, and on the outer face thereof B$^2$ are formed the teeth of a ratchet-wheel. With the teeth of this ratchet-wheel pawls C, Fig. 4, are adapted to engage, and these pawls can be advanced or withdrawn at will by mechanism described hereinafter, thus forming clutches between the axle and wheels.

The rod of the piston G, as shown in Fig. 9, consists, preferably, of two racks, which actuate directly and simultaneously the before-mentioned wheels B, one of which gears above the traveling-wheel axle with the teeth on the inner face of one of said wheels and the other underneath the traveling-wheel axle with the teeth on the inner face of the other wheel. By these means the wheels B are turned in opposite directions when the piston is drawn out, and this movement is of course reversed when the piston is moved in.

The operation of the brake is as follows: When it is desired to stop the vehicle, two pairs of pawls C, mounted with springs in a movable frame C', are placed against the ratchet-teeth of the wheels B. As these wheels turn in opposite directions one pair of the pawls will slide over the teeth of one wheel B, while the other will engage with the teeth of the other wheel, thus coupling the apparatus with the before-mentioned sleeve A and the axle, and the piston will then be drawn out. By these means a vacuum is formed in the cylinder, and the force necessary to draw the piston out stops the vehicle. A safety-pawl N, Figs. 8, 9, and 10, engaging with the upper rack of the piston-rod, allows the piston-rod to move outward and prevents it from returning until the said pawl is released from the teeth of the rack. When the vehicle is to be started again, the pawl N is lifted by mechanism described hereinafter, and the atmospheric pressure will then force the piston in. The direction of the movement of the wheels B will be reversed, and the other previously-disengaged wheel will now be coupled with the axle and will start the vehicle.

Figure 7:
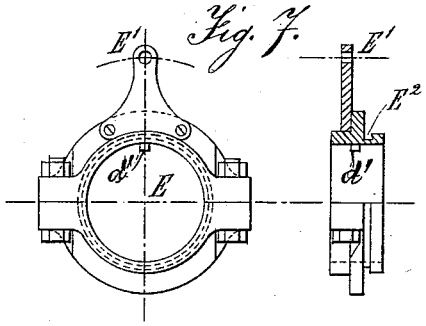
Figure 6:
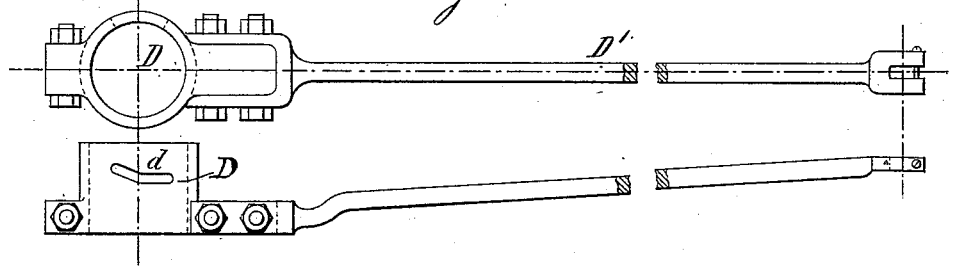
Figure 10:
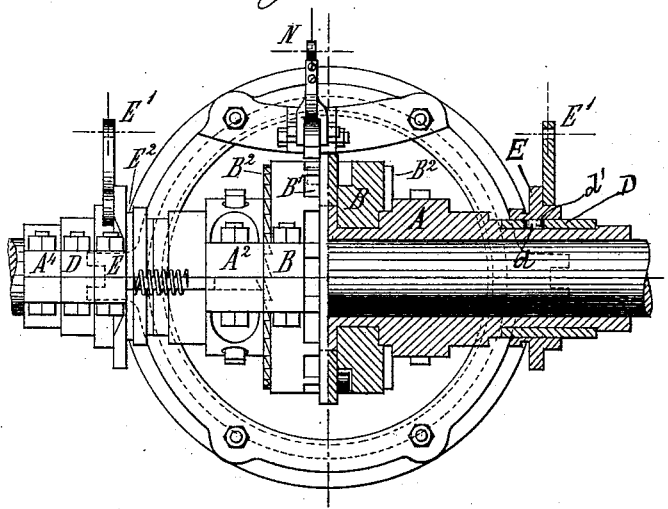
Figure 11:
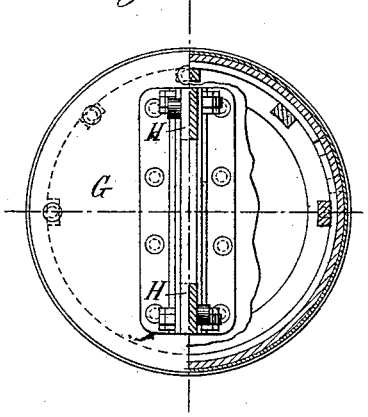

The above-named pawls C are actuated in the following manner: On the parts $A^3$ of the sleeve A are mounted loose straps D, each consisting of two pieces bolted together. These straps do not turn with the sleeve A, as they are attached to the sides of the cylinder by means of rods D'. The straps extend somewhat toward the middle of the sleeve, and on these extensions are mounted collars E. Each of the extensions is formed with a slot $d$, one half of which is paralled with the sides of the strap, while the other inclines toward the center of the sleeve. The collar E is provided on the inside with a pin $d'$, which fits into the said slot $d$, so that the collar will be displaced longitudinally on the sleeve when it is turned by means of an arm E' fixed to it. The collar E is also extended toward the middle of the sleeve, and this extension is formed with a dovetailed groove, in which engages the movable frame C', Fig. 8, carrying the pawls C. The pawls can be engaged or disengaged during the traveling of the vehicle by actuating the before-mentioned arm E', Fig. 7. The mechanism for transmitting the movement to the pawls can be actuated from either end of the vehicle.

For providing for the traveling of the vehicle in either direction, there is arranged at each end thereof a pawl M, engaging with the plate L. When traveling in one direction, one of these pawls M is in operation, and when traveling in the opposite direction the other pawl M is used, these pawls being thrown into and out of engagement by hand or otherwise at the then forward end of the vehicle and serving to hold the rod controlling one of the pawls C forward, whereby said pawl is kept in engagement when the operating-lever is shifted to start the vehicle. If it be desired to stop the car, Fig. 12, and the driver stands at the then forward end, he will draw over a lever $g$ or $h$, as the case may be, into the position $g'$ or $h'$, and through rods $b$ or $c$ and $d$ or $d'$, connected with it, will actuate the before-mentioned collar E, and the brake will thus be caused to act, the pawl M being automatically engaged with the plate L to hold the proper rod forward. At the same time, by means of the rods 1 and 2 or 3 and 4 and levers 5 6 7, the before-mentioned safety-pawl N, Fig. 9, will be brought into engagement with its rack and will retain the piston-rod in the position to which it will have been moved at the end of the operation—$i.\ e.$, when the vehicle has stopped. To restart the vehicle, it is only necessary to move the lever $g$ back to its original position, when the levers 1 and 2 will lift the pawl N from its rack and the piston will be driven in again by the atmospheric pressure and the vehicle will be started, as described above.

From the foregoing it will be seen that there is no chance for the piston to move in without rotating the axle, as the pawl in the connection for giving the forward impetus is held in gear from the time the operating-lever is first shifted to stop the wheels, a further safeguard being secured by means of the safety-pawl before described.

I claim—

1. In an automatic brake and starter for vehicles, the combination, with the drive-axle and a vacuum-chamber or similar spring-power storage and supply, of two wheels mounted loosely on the axle, connections between the opposite sides of said wheels and the source of power storage and supply, and spring-pressed clutches engaging said wheels simultaneously during the stopping and power-storing operations, substantially as described.

2. In an automatic brake or starter for vehicles, the combination, with the drive-axle and a vacuum-chamber or similar spring-power storage and supply, of two wheels mounted loosely on the axle, independent clutches for connecting said axle and wheels, a lever for simultaneously throwing said clutches into operative position, and connections between the opposite sides of said wheels and the source of power storage and supply, substantially as described.

3. In an automatic brake and starter for vehicles, the combination, with the drive-axle and a vacuum-chamber or similar spring-power storage and supply, of two wheels mounted loosely on the axle, independent clutches for connecting said axle and wheels, a lever for simultaneously throwing said clutches into and out of operative position, a catch for holding one of said clutches in operative position, and connections between the opposite sides of said wheels and the source of power storage and supply, substantially as described.

4. In an automatic brake and starter for vehicles, the combination, with the drive-axle and a vacuum-chamber or similar spring-power storage and supply, of two wheels mounted loosely on the drive-axle with the abutting faces toothed, and connecting-rods working between said wheels and having projections thereon engaging said toothed wheels on opposite sides of the shaft, substantially as described.

5. In an automatic brake and starter for vehicles, the combination, with the drive-axle and a vacuum-chamber or similar spring-power storage and supply, of two wheels mounted on the drive-axle with the abutting and outer faces toothed, connecting-rods working between said wheels and having projections thereon engaging the teeth on the abutting faces, and the pawls on the drive-axle engaging the teeth on the outer surface, substantially as described.

6. In an automatic brake and starter for vehicles, the combination, with the vacuum-chamber or similar source of spring-power storage and supply, the wheels operated thereby, the drive-shaft, and pawls connecting said axle and wheels, of the collar controlling said pawls, movable around the shaft, and the cam-surfaces for causing said collar to move longitudinally of the shaft when turned, substantially as described.

7. In an automatic brake and starter for vehicles, the combination, with the vacuum-chamber or similar source of spring-power storage and supply, the wheels operated thereby, the drive-shaft, and pawls connecting said axle and wheels, of the collar controlling said pawls, movable around the shaft, the stationary collars, the cam-surface slots and pins for causing said collar to move longitudinally of the shaft when turned, substantially as described.

8. In an automatic brake and starter, the combination, with the vacuum-chamber or similar source of spring-power storage and supply and the independent wheels driven thereby, having the oppositely-arranged ratchet-teeth thereon, of the shaft and the independent pawls connected therewith and engaging the ratchet-teeth to arrest the movement of the wheels in the same direction, whereby the shaft may be rotated in either direction, substantially as described.

9. In an automatic brake and starter, the combination, with the vacuum-chamber or similar source of spring-power storage and supply, the independent wheels having ratchet-teeth thereon, and a connection between the opposite sides of said wheels, respectively, and the source of power storage and supply, of independent pawls for arresting the movement of the wheels in the same direction, whereby the power may be stored and applied when the vehicle is running in either direction, substantially as described.

10. In an automatic brake and starter, the combination, with the vacuum-chamber or similar source of spring-power storage and supply, the independent wheels, and a connection between the opposite sides of said wheels, respectively, and the source of power storage and supply, of independent pawls for arresting the movement of the wheel in the same direction, a lever for throwing said pawls into and out of gear, and catches M for holding either of said pawls in gear independently of the other, substantially as described.

11. In an automatic brake and starter, the combination, with the vacuum-chamber or similar source of spring-power storage and supply, the drive-shaft, the wheels connected therewith, and connecting-rods for driving said wheels from the source of power-supply, of the safety-pawl N and its operating-rod, substantially as described.

In testimony whereof I have hereto set my hand in the presence of two subscribing witnesses.

GAETANO GIUSSANI.

Witnesses:
CARLOS SACCO,
SERONDO GRETO.